(12) United States Patent
Xu et al.

(10) Patent No.: US 10,708,215 B2
(45) Date of Patent: Jul. 7, 2020

(54) METHOD AND APPARATUS FOR DISPLAYING COMMENT INFORMATION

(71) Applicant: Shanghai Hode Information Technology Co.,Ltd., Shanghai (CN)

(72) Inventors: Yi Xu, Shanghai (CN); Fan Lan, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 434 days.

(21) Appl. No.: 15/456,225

(22) Filed: Mar. 10, 2017

(65) Prior Publication Data

US 2017/0264585 A1 Sep. 14, 2017

(30) Foreign Application Priority Data

Feb. 26, 2016 (CN) .......................... 2016 1 0106047

(51) Int. Cl.
*G06F 13/00* (2006.01)
*H04L 12/58* (2006.01)
*H04L 29/08* (2006.01)
*H04L 29/06* (2006.01)

(52) U.S. Cl.
CPC .............. *H04L 51/32* (2013.01); *H04L 67/26* (2013.01); *H04L 67/42* (2013.01)

(58) Field of Classification Search
CPC ......... H04L 51/32; H04L 67/42; H04L 67/26; H04L 51/14; G06Q 50/01; G06Q 10/10
USPC ......... 709/204–206; 715/751–759, 779–781, 715/783

See application file for complete search history.

(56) References Cited

U.S. PATENT DOCUMENTS

| | | | |
|---|---|---|---|
| 7,809,773 B2 | 10/2010 | Horowitz et al. | |
| 8,019,815 B2 | 9/2011 | Keener et al. | |
| 8,376,910 B2 | 2/2013 | Cheung et al. | |
| 8,545,369 B2 | 10/2013 | Cheung et al. | |
| 8,555,177 B1 | 10/2013 | Junee et al. | |
| 8,628,414 B2 | 1/2014 | Walker et al. | |
| 8,676,892 B2 * | 3/2014 | Su | H04W 4/21 709/204 |
| 8,701,153 B2 | 4/2014 | Abrams | |
| 9,003,306 B2 | 4/2015 | Mehin et al. | |
| 9,165,287 B2 * | 10/2015 | Habib | G06Q 10/10 |
| 9,253,225 B1 | 2/2016 | Junee et al. | |

(Continued)

*Primary Examiner* — Kenneth R Coulter
(74) *Attorney, Agent, or Firm* — BakerHostetler

(57) ABSTRACT

Techniques for displaying comment information are described herein. A method includes playing the target video, displaying the comments information associated with a video when said video is being played, displaying the social functions corresponding to said specific comment information when receiving the selection command corresponding to the specific comments information currently displayed, receiving the social information sending command corresponding to said social functions, obtaining the command inputted by the user on said social function panel, displaying said command corresponding to said specific comments information, and sending the server a request to add said command of said specific comments information so that said server will add said command into the comments information of said target video and record said command as the social information of said specific comments information. This invention allows the user to use more social functions when using the comments.

16 Claims, 3 Drawing Sheets

(56) References Cited

U.S. PATENT DOCUMENTS

| | | | |
|---|---|---|---|
| 9,332,315 B2 | 5/2016 | Agrawal | |
| 9,467,408 B1 | 10/2016 | Sherman-Presser et al. | |
| 9,704,165 B2* | 7/2017 | Anderson | G06Q 10/06 |
| 10,448,073 B2* | 10/2019 | Lan | H04N 21/254 |
| 10,565,258 B2* | 2/2020 | Brown | H04L 67/2804 |
| 2009/0249223 A1 | 10/2009 | Barsook et al. | |
| 2012/0110088 A1* | 5/2012 | Su | H04W 4/21 |
| | | | 709/205 |
| 2012/0331496 A1 | 12/2012 | Copertino et al. | |
| 2013/0262168 A1* | 10/2013 | Makanawala | H04L 51/32 |
| | | | 705/7.14 |
| 2013/0262320 A1* | 10/2013 | Makanawala | H04L 51/32 |
| | | | 705/304 |
| 2013/0326352 A1 | 12/2013 | Morton | |
| 2013/0328932 A1* | 12/2013 | Kim | H04L 65/403 |
| | | | 345/636 |
| 2014/0012910 A1 | 1/2014 | White | |
| 2014/0013200 A1 | 1/2014 | White | |
| 2014/0081435 A1 | 3/2014 | Wagner | |
| 2014/0089801 A1 | 3/2014 | Agrawal | |
| 2014/0092127 A1 | 4/2014 | Kruglick | |
| 2014/0129331 A1* | 5/2014 | Spivack | G06Q 30/0269 |
| | | | 705/14.53 |
| 2014/0258198 A1* | 9/2014 | Spivack | G06N 5/046 |
| | | | 706/21 |
| 2014/0327677 A1* | 11/2014 | Walker | G06T 11/206 |
| | | | 345/440 |
| 2014/0365302 A1* | 12/2014 | Walker | G06T 11/206 |
| | | | 705/14.53 |
| 2015/0019644 A1* | 1/2015 | Walker | G06T 11/206 |
| | | | 709/204 |
| 2015/0082342 A1 | 3/2015 | Norwood et al. | |
| 2015/0163184 A1* | 6/2015 | Kanter | G06Q 50/01 |
| | | | 709/204 |
| 2015/0261853 A1 | 9/2015 | Shao | |
| 2016/0255037 A1* | 9/2016 | Spivack | G06Q 10/10 |
| | | | 706/12 |
| 2016/0316272 A1 | 10/2016 | Li | |
| 2016/0342287 A1 | 11/2016 | Barker et al. | |
| 2017/0142051 A1* | 5/2017 | Spivack | G06Q 10/10 |
| 2017/0163580 A1* | 6/2017 | Zhang | H04L 51/10 |
| 2017/0169039 A1* | 6/2017 | Brown | G06F 16/7867 |
| 2018/0048599 A1* | 2/2018 | Arghandiwal | H04L 51/046 |
| 2018/0227617 A1* | 8/2018 | Zhu | H04N 21/233 |
| 2018/0255356 A1* | 9/2018 | Zhao | G06F 3/04886 |

* cited by examiner

METHOD AND APPARATUS FOR DISPLAYING COMMENT INFORMATION

CROSS-REFERENCE TO RELATED APPLICATION

The present application claims priority to Chinese Patent Application No. 201610106047.5 filed on Mar. 11, 2016, and the entire contents of which are hereby incorporated herein by reference.

FIELD OF THE INVENTION

This invention relates generally to information displaying system and more particularly to representing social functions on screen information.

BACKGROUND OF THE INFORMATION

Bullet screen messages refers to the presentation of both a video and the comments on it on the same screen. The Comments shown by strings of words are being displayed real-time as a video is being played, so that comments are highly related to the video content in real time, with which scroll on the screen look like bullets, those comments are named bullet screen. And a viewer, when watching the video, can watch bullet screen messages sent by himself/herself or other viewers.

Yet Social networks are widely used to share information among friends or even strangers. Increasingly, people share indications that they "like" particular content, such as web pages, songs, etc. The present disclosure concerns, in some respects, extending concepts of social networks and even "liking" to the realm of a single statement created by other people. Thus social functions could be applied to bullet screen messages system.

SUMMARY OF THE INVENTION

The bullet screen messages system, namely method and apparatus for displaying a comments information system is described as follows:

When an online video is being played, the server can obtain so called bullet screen messages from the terminal, and then, from time to time, add users' bullet screen messages to the online video to be displayed, so that a user, when watching the online video, can read the Comments sent by himself/herself or other viewers.

This invention provides a method to display a bullet screen information system, said technical scheme is as follows:

First, it provides a method and its apparatus for a display comments information system, said method comprising:

Displaying comments information associated with a video while the video is being displayed, the comments information including a plurality of screen messages;

Presenting a plurality of social functions associated with a screen message among the plurality of screen messages in response to a selection of one of the plurality of screen messages;

Receiving data corresponding to a selected social function among the plurality of social functions and associating received data with the screen message among the plurality of screen messages; and Sending a request to a server for storing the received data into a database, the request including an identification of the screen message.

The server receiving the social information sending command corresponding to said social functions, obtaining the command inputted by the user on said social function panel, displaying said command corresponding to said specific bullet screen information, and sending the server a request to add said command of said specific bullet screen information so that said server will add said command into the bullet screen information of said target video and record said command as the social information of said specific bullet screen information; and said social functions and social information sending commands which include Like, Comment, Repost, and Follow.

Said social functions generally described as follows:

In response to selecting a social activity function among the plurality of social functions, generating a social activity and adding the social activities into an activity push queue of the screen message according to the identification of the screen message, the social activity including the screen message and social information associated with the screen message; and increasing by one a count of unread social activity associated with the screen message.

Said Comment function includes that:

in response to selecting a comment function among the plurality of social functions, generating a comment activity and adding the comment activity into an activity push queue of the screen message according to the identification of the screen message, the comment activity including the screen message and social information associated with the screen message; and increasing by one a count of unread comment activities associated with the screen message.

Said Like function includes that:

in response to selecting a like function among the plurality of social functions, generating a like record and increasing by one a like count associated with the screen message.

Said Like function also includes that:

Inactivating the like function in response to a determination that the like function associated with the screen message was selected.

Said Repost function includes that:

in response to selecting a repost function among the plurality of social functions, generating a repost activity and adding the repost activity into an activity push queue of the screen message; and increasing by one a count of unread repost activities associated with the screen message.

Said Follow function includes that:

in response to selecting a follow function among the plurality of social functions, generating a follow activity and adding the follow activity into an activity push queue of the screen message; and increasing by one a count of unread follow activities associated with the screen message.

Second, it provides the terminal of a display bullet screen information system,

A system comprising:

one or more processors:

one or more memories coupled to the one or more processors, the one or more memories storing instructions that upon execution cause the system at least to:

display comments information associated with a video while the video is being displayed, the comments information including a plurality of screen messages;

present a plurality of social functions associated with a screen message among the plurality of screen messages in response to a selection of one of the plurality of screen messages;

receive data corresponding to a selected social function among the plurality of social functions and associate received data with the screen message among the plurality of screen messages; and send a request to a server for storing the received data into a database, the request including an identification of the screen message.

The system wherein the plurality of social functions comprise comment, like, repost, and follow.

Wherein the one or more memories further comprise instructions that upon execution cause the system at least to:

in response to selecting a comment function among the plurality of social functions, generate a comment activity and add the comment activity into an activity push queue of the screen message according to the identification of the screen message, the comment activity including the screen message and social information associated with the screen message; and increase by one a count of unread comment activities associated with the screen message.

The system wherein the one or more memories further comprise instructions that upon execution cause the system at least to:

in response to selecting a like function among the plurality of social functions, generate a like record and increase by one a like count associated with the screen message.

The system wherein the one or more memories further comprise instructions that upon execution cause the system at least to:

inactivate the like function in response to a determination that the like function associated with the screen message was selected.

The system wherein the one or more memories further comprise instructions that upon execution cause the system at least to:

in response to selecting a repost function among the plurality of social functions, generate a repost activity and add the repost activity into an activity push queue of the screen message; and increase by one a count of unread repost activities associated with the screen message.

The system wherein the one or more memories further comprise instructions that upon execution cause the system at least to:

in response to selecting a follow function among the plurality of social functions, generate a follow activity and add the follow activity into an activity push queue of the screen message; and increase by one a count of unread follow activities associated with the screen message.

A non-transitory computer-readable medium, having stored therein a set of computer-readable instructions which upon execution cause a computing system at least to:

display comments information associated with a video while the video is being displayed, the comments information including a plurality of screen messages;

present a plurality of social functions associated with a screen message among the plurality of screen messages in response to a selection of one of the plurality of screen messages;

receive data corresponding to a selected social function among the plurality of social functions and associate received data with the screen message among the plurality of screen messages; and send a request to a server for storing the received data into a database, the request including an identification of the screen message.

The non-transitory computer-readable medium wherein the plurality of social functions comprise comment, like, repost, and follow.

The non-transitory computer-readable medium having further stored computer-readable instructions that upon execution cause the computing system at least to:

in response to selecting a comment function among the plurality of social functions, generate a comment activity and add the comment activity into an activity push queue of the screen message according to the identification of the screen message, the comment activity including the screen message and social information associated with the screen message; and increase by one a count of unread comment activities associated with the screen message.

The non-transitory computer-readable medium of having further stored computer-readable instructions that upon execution cause the computing system at least to:

in response to selecting a like function among the plurality of social functions, generate a like record and increase by one a like count associated with the screen message; and inactivate the like function in response to a determination that the like function associated with the screen message was selected.

The non-transitory computer-readable medium of having further stored computer-readable instructions that upon execution cause the computing system at least to:

in response to selecting a repost function among the plurality of social functions, generate a repost activity and add the repost activity into an activity push queue of the screen message; and increase by one a count of unread repost activities associated with the screen message.

The non-transitory computer-readable medium of having further stored computer-readable instructions that upon execution cause the computing system at least to:

in response to selecting a follow function among the plurality of social functions, generate a follow activity and add the follow activity into an activity push queue of the screen message; and increase by one a count of unread follow activities associated with the screen message.

SPECIFIC EMBODIMENTS

Figure 1:
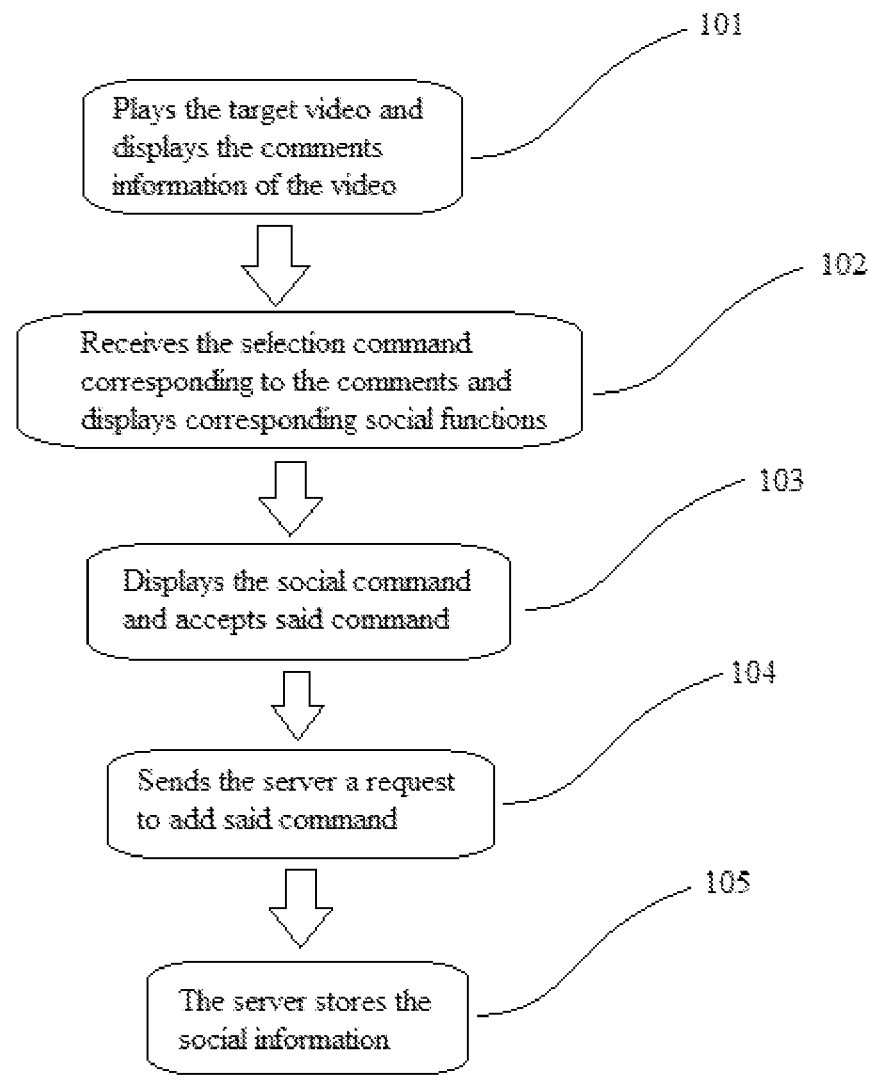
FIG. 1 is a flow diagram illustrating a method for a comments information display system according to the present invention.

This invention will be described below in a more detailed manner with the aid of appended diagrams. Evidently, the described embodiments are only part of rather than all of the embodiments of the present invention. The following description of at least one exemplary embodiment is only explanatory, and does not limit the present invention and its applications or other uses. All the other embodiments obtained by an ordinary person skilled in the art without creative work will fall within the scope of protection of the present invention.

Unless specified otherwise, the parts, relative arrangements, functions and numerical values mentioned in these embodiments shall not limit the scope of the present invention.

Meanwhile, evidently, to facilitate depiction, the sizes of the parts shown in the appended diagrams are not drawn to scale.

Technologies, methods and devices already known to ordinary technicians in relevant arts will not be described in detail. However, when appropriate, said technologies, methods and devices shall be deemed part of the patent grant.

In all the examples shown and discussed herein, any specific value shall be construed as merely illustrative but not limiting. Therefore, other examples of procedural embodiments may have different sequences.

Software instructions for implementing the detailed functionality can be readily authored by artisans, from the descriptions provided herein, e.g., written in C, C++, Visual Basic, Java, Python, Tcl, Perl, Scheme, Ruby, etc. Mobile devices according to the present technology can include software modules for performing the different functions and acts. Commonly, each device includes operating system software that provides interfaces to hardware resources and general purpose functions, and also includes application software which can be selectively invoked to perform particular tasks desired by a user. Known browser software, communications software, photography apps, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software. In the interest of conciseness, the myriad variations and combinations of the described technology are not cataloged in this document. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect. To provide a comprehensive disclosure, while complying with the statutory requirement of conciseness, applicants incorporate-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

FIG. 1 is a flow diagram illustrating a method for a comments information display system according to the present invention;

First, this invention provides a method and its apparatus for a display comments information system;

playing the target video, displaying the comments information 101 of the target video when said target video is being played;

displaying social functions 102 corresponding to said specific comments information when receiving the selection command corresponding to the specific comments information currently displayed;

receiving the social information sending command corresponding to said social functions, obtaining the command inputted by the user on said social function panel, displaying said command 103 corresponding to said specific comments information, and sending the server request 104 to add said command of said specific comments information, so that said server will add said command into the comments information of said target video, and record said command as social information 105 of said specific comments information; and said social functions and social information sending commands which include Comment, Like, Repost, and Follow.

Figure 2:
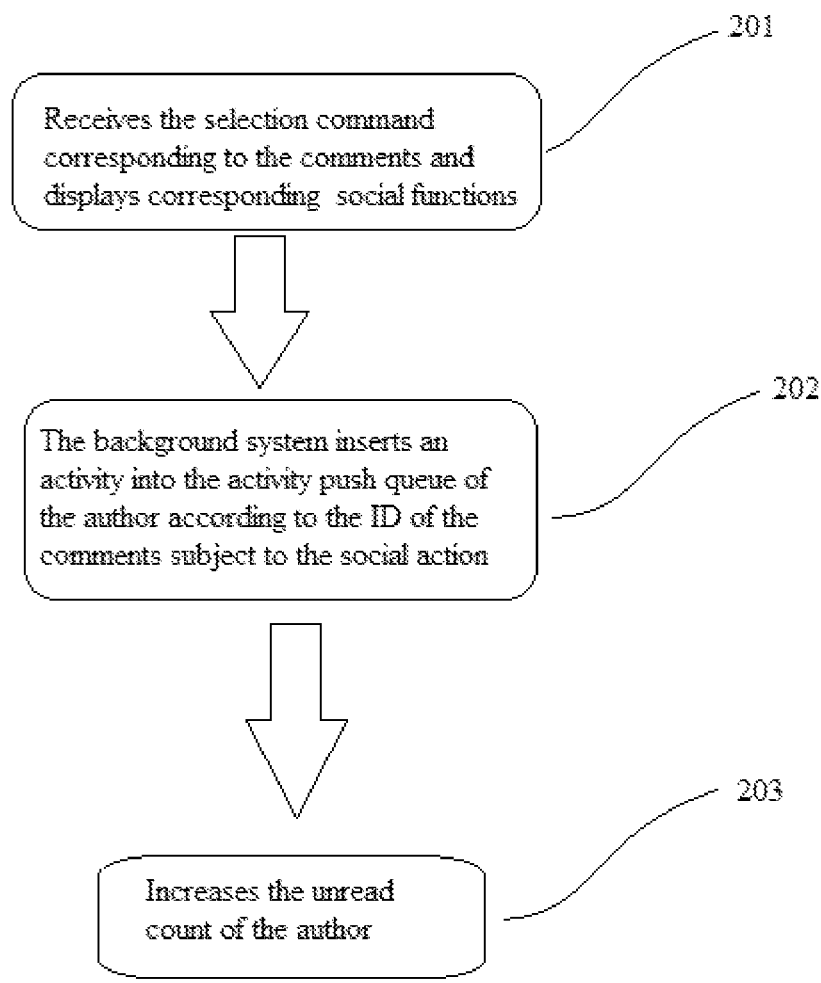
FIG. 2 is a flow diagram illustrating the completion of a social action based on a method for a comments information display system according to the present invention.

FIG. 2 is a flow diagram illustrating the completion of a social action based on a method for a comments information display system according to the present invention; and said social actions include Comment, Like, Repost and Follow function.

Said Comment function includes that:

Comment option 201 corresponding to said current bullet screen or said Comment is displayed when receiving the selection command corresponding to the bullet screen information currently displayed or the Comment on the bullet screen; when said server receives the Comment on the bullet screen, the background system finds the author of the Comment on said bullet screen according to the ID of the bullet screen commented on, and the system will insert Comment activity 202 into the activity push queue of the author of said Comment on the bullet screen, including the bullet screen commented on or the Comment and the reply, and will make the unread count of the author of said Comment on the bullet screen +1 (203).

Said Like function includes that:

When receiving the selection command corresponding to the bullet screen information currently displayed, the Like button corresponding to said current bullet screen will be displayed, and Like button 201 will be added to the bullet screen; after the user clicks the Like button attached to the bullet screen, the client will send a Like request, said Like request including the identifier of the Liked bullet screen and the identifier of the user; after receiving the Like request, the system will insert Like record 202 into the database, said Like record including the ID of the Liking person, the Liked bullet screen and the time of Liking, and will make the Like count of the Liked bullet screen +1 (203).

Said Like function also includes that:

When said terminal requests bullet screen data, the system will check Like records to see if the user Liked the bullet screen, and will return relevant information to the client; and the client will decide whether or not to highlight the Like button.

Said Repost function includes that:

Repost option 201 corresponding to said current bullet screen is displayed when receiving the selection command corresponding to the bullet screen information currently displayed; when said server receives a command to repost the bullet screen, the background system finds the author of the bullet screen according to the ID of the Reposted bullet screen, and the system will insert a Repost activity into the activity push queue of the author of said bullet screen 202, including the Reposted bullet screen, and will make the unread count of the author of said bullet screen +1 (203).

Said Follow function includes that:

Follow button 201 corresponding to said current bullet screen is displayed when receiving the selection command corresponding to the bullet screen information currently displayed;

When said server receives the Follow command, said system finds the author of the bullet screen according to the ID of the bullet screen, and the system will insert Follow activity 202, including the ID of the Follower, into the activity push queue of the author of said bullet screen, and will make the unread count of the author of said bullet screen +1 (203).

Second, it provides the terminal of a display bullet screen information system, the terminal comprising:

the system components detailed in this specification may be implemented as instructions for computing devices, including general purpose processor instructions for a variety of programmable processors, including microprocessors, graphics processing units, digital signal processors, etc. These instructions may be implemented as software, firmware, etc. These instructions can also be implemented to various forms of processor circuitry, including programmable logic devices, FPGAs, FPOAs, and application specific circuits—including digital, analog and mixed analog/digital circuitry. Execution of the instructions can be distributed among processors and/or made parallel across processors within a device or across a network of devices. Transformation of content signal data may also be distributed among different processor and memory devices.

Playing the video, displaying the comments information associated with the video when said video is being played;

displaying the social functions corresponding to said specific comments information when receiving the selection command corresponding to the specific comments information currently displayed;

receiving the social information sending command corresponding to said social functions, obtaining the command inputted by the user on said social function panel, displaying said command corresponding to said specific comments information, and sending the server a request to add said command of said specific comments information so that said server will add said command into the comments information of said video and record said command as the social information of said specific comments information; and said social functions and social information sending commands which include Comment, Like, Repost, and Follow.

Said Comment function includes that:

The Comment option corresponding to said current comments or said Comment is displayed when receiving the selection command corresponding to the comments information currently displayed or the Comment on the comments; when said server receives the Comment on the comments, the background system finds the author of the Comment on said comments according to the ID of the comments commented on, and the system will insert a Comment activity into the activity push queue of the author of said Comment on the comments, including the comments commented on or the Comment and the reply, and will make the unread count of the author of said Comment on the comments +1.

Said Like function includes that:

when receiving the selection command corresponding to the comments information currently displayed, the Like button corresponding to said current comments will be displayed, and a Like button will be added to the comments; after the user clicks the Like button attached to the comments, the client will send a Like request, said Like request including the identifier of the Liked comments and the identifier of the user; after receiving the Like request, the system will insert a Like record into the database, said Like record including the ID of the Liking person, the Liked comments and the time of Liking, and will make the Like count of the Liked comments +1.

Said Like function also includes that:

When said terminal requests comments data, the system will check Like records to see if the user Liked the comments, and will return relevant information to the client; and the client will decide whether or not to highlight the Like button.

Said Repost function includes that:

The Repost option corresponding to said current comments is displayed when receiving the selection command corresponding to the comments information currently displayed; when said server receives a command to repost the comments, the background system finds the author of the comments according to the ID of the Reposted comments, and the system will insert a Repost activity into the activity push queue of the author of said comments, including the Reposted comments, and will make the unread count of the author of said comments +1.

Said Follow function includes that:

The Follow button corresponding to said current comments is displayed when receiving the selection command corresponding to the comments information currently displayed;

when said server receives the Follow command, said system finds the author of the comments according to the ID of the comments, and the system will insert a Follow activity, including the ID of the Follower, into the activity push queue of the author of said comments, and will make the unread count of the author of said comments +1.

Figure 3:
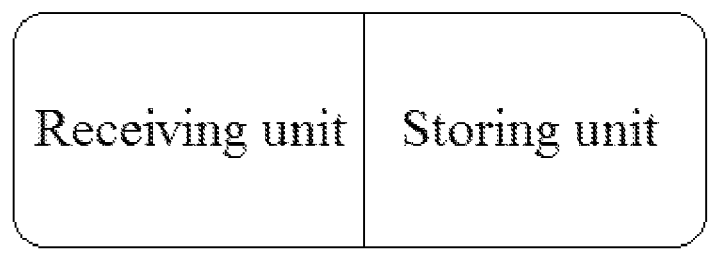
FIG. 3 is a diagram illustrating the structure of the server for a method for a comments information display system according to the present invention.

FIG. 3 is a diagram illustrating the structure of the server for a method for a comments information display system according to the present invention.

Third, it provides a server used to store comments information, said server comprising:

a receiving unit used to receive the request to add the social information of the comments information sent from the terminal, said social information adding request containing the identifier of said comments information and the identifier of said social information; and a recording unit used to add said social information into the comments information of said video and record said social information as the social value of said comments information.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and devices described herein may be embodied in a variety of other forms; furthermore, various omissions, substitutions and changes in the form of the methods and devices described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
displaying comment information associated with a video while the video is being displayed, the comment information including a plurality of screen messages;
presenting a plurality of social functions associated with a screen message among the plurality of screen messages in response to a selection of one of the plurality of screen messages;
receiving data corresponding to a selected social function among the plurality of social functions and associating received data with the screen message among the plurality of screen messages;
sending a request to a server for storing the received data into a database, the request including an identification of the screen message; and
wherein the method further comprises in response to selecting a comment function among the plurality of social functions, generating a comment activity and adding the comment activity into an activity push queue of the screen message according to the identification of the screen message, the comment activity including the screen message and social information associated with the screen message.

2. The method of claim 1, wherein the plurality of social functions comprise comment, like, repost, and follow.

3. The method of claim 1, further comprising:
increasing by one a count of unread comment activities associated with the screen message.

4. The method of claim 1, further comprising:
in response to selecting a like function among the plurality of social functions, generating a like record and increasing by one a like count associated with the screen message.

5. The method of claim 4, further comprising:
inactivating the like function in response to a determination that the like function associated with the screen message was selected.

6. The method of claim 1, further comprising:
in response to selecting a repost function among the plurality of social functions, generating a repost activity and adding the repost activity into the activity push queue of the screen message.

7. The method of claim 6, further comprising:
increasing by one a count of unread repost activities associated with the screen message.

8. The method of claim 1, further comprising:
in response to selecting a follow function among the plurality of social functions, generating a follow activity and adding the follow activity into the activity push queue of the screen message.

9. The method of claim 8, further comprising:
increasing by one a count of unread follow activities associated with the screen message.

10. A client computing device, comprising instructions that upon execution cause the client computing device at least to:
display comment information associated with a video while the video is being displayed, the comment information including a plurality of screen messages;
present a plurality of social functions associated with a screen message among the plurality of screen messages in response to a selection of one of the plurality of screen messages;
receive data corresponding to a selected social function among the plurality of social functions and associate received data with the screen message among the plurality of screen messages;
send a request to a server for storing the received data into a database, the request including an identification of the screen message; and
wherein the client computing device further comprises instructions that upon execution cause the client computing device at least to:
in response to selecting a comment function among the plurality of social functions, generate a comment activity and add the comment activity into an activity push queue of the screen message according to the identification of the screen message, the comment activity including the screen message and social information associated with the screen message.

11. The client computing device of claim 10, wherein the plurality of social functions comprise comment, like, repost, and follow.

12. The client computing device of claim 10, further comprising instructions that upon execution cause the client computing device at least to:
increase by one a count of unread comment activities associated with the screen message.

13. The client computing device of claim 10, further comprising instructions that upon execution cause the client computing device at least to:
in response to selecting a like function among the plurality of social functions, generate a like record and increase by one a like count associated with the screen message.

14. The client computing device of claim 13, further comprising instructions that upon execution cause the client computing device at least to:
inactivate the like function in response to a determination that the like function associated with the screen message was selected.

15. The client computing device of claim 10, further comprising instructions that upon execution cause the client computing device at least to:
in response to selecting a repost function among the plurality of social functions, generate a repost activity and add the repost activity into the activity push queue of the screen message; and
increase by one a count of unread repost activities associated with the screen message.

16. The client computing device of claim 10, further comprising instructions that upon execution cause the client computing device at least to:
in response to selecting a follow function among the plurality of social functions, generate a follow activity and add the follow activity into the activity push queue of the screen message; and
increase by one a count of unread follow activities associated with the screen message.

* * * * *